Figure 1:
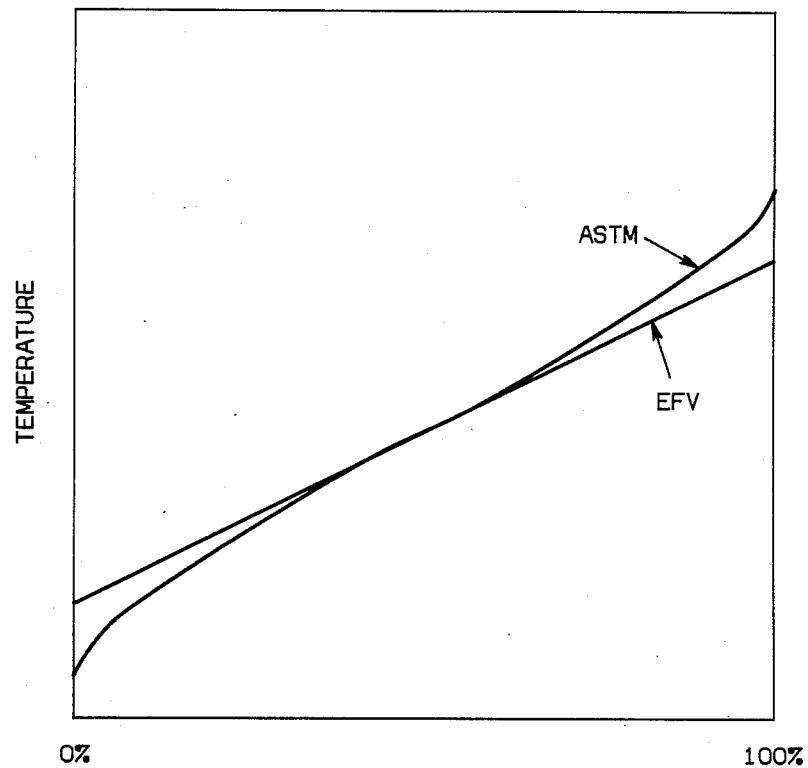

United States Patent [19]

Jain

[11] Patent Number: 4,555,309
[45] Date of Patent: Nov. 26, 1985

[54] CONTROL OF A FRACTIONAL DISTILLATION PROCESS

[75] Inventor: Gyan P. Jain, Tulsa, Okla.

[73] Assignee: Phillips Petroleum Company, Bartlesville, Okla.

[21] Appl. No.: 524,489

[22] Filed: Aug. 19, 1983

[51] Int. Cl.⁴ ............................................. B01D 3/42
[52] U.S. Cl. .......................................... 203/1; 203/2; 203/3; 203/96; 202/160; 364/501
[58] Field of Search ........................................ 203/1–3, 203/96; 202/160, 206, DIG. 18; 208/DIG. 1; 196/132, 141; 62/21, 37; 364/501

[56] References Cited

U.S. PATENT DOCUMENTS

| | | | |
|---|---|---|---|
| 3,296,097 | 1/1967 | Lupfer | 203/2 |
| 3,331,753 | 7/1967 | Foester et al. | 196/132 |
| 3,354,053 | 11/1967 | Johnson | 203/2 X |
| 3,840,437 | 10/1974 | Awan et al. | 203/2 |
| 3,996,785 | 12/1976 | Mead et al. | 73/17 A |
| 4,007,112 | 2/1977 | Benker et al. | 208/350 |
| 4,166,770 | 9/1979 | Anderson et al. | 203/2 |
| 4,289,588 | 9/1981 | Hofferber | 203/2 |
| 4,347,577 | 8/1982 | Ganster et al. | 364/501 |

Primary Examiner—Wilbur Bascomb
Attorney, Agent, or Firm—French and Doescher

[57] ABSTRACT

In a fractional distillation process in which it is desired to maintain a desired ASTM end point temperature of the overhead liquid product withdrawn from the fractional distillation process, changes in the heat removed by the fractional distillation process per unit of the feed are utilized to determine the equilibrium flash vaporization initial point and the equilibrium flash vaporization end point temperature for the overhead liquid product. The initial point temperature and end point temperature are then utilized to determine the actual slope of the equilibrium flash vaporization boiling point line. Changes in the slope of the equilibrium flash vaporization boiling point line are utilized to determine the actual slope of the ASTM boiling point curve at any particular time. The actual ASTM end point temperature for the overhead liquid product is derived based on the actual slope of the ASTM boiling point curve thus determined. The actual ASTM end point temperature is utilized to control the fractional distillation process so as to maintain a desired ASTM end point temperature for the overhead liquid product withdrawn from the fractional distillation process.

24 Claims, 4 Drawing Figures

CONTROL OF A FRACTIONAL DISTILLATION PROCESS

This invention relates to control of a fractional distillation process. In one aspect, this invention relates to method and apparatus for maintaining a desired ASTM end point temperature for the overhead liquid product from a fractional distillation process.

As used herein, the term "end point temperature" refers to the temperature at which all of a liquid has boiled off. The term "initial point temperature" refers to a temperature at which a liquid first begins to boil. The American Society for Testing Materials (ASTM) describes particular procedures for determining an end point temperature and, as used herein, the ASTM end point temperature refers to an end point temperature determined by the procedures specified by ASTM.

Fractional distillation columns are employed in many processes to make desired separations. The separations may range from single component separations to the more complex multiple separations performed by crude distillation towers. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to effect the desired separation. It is also noted that, in towers such as crude distillation towers where a more complex separation is being performed, side products may also be withdrawn from the fractional distillation column.

Various specifications are used for the product streams withdrawn from a fractional distillation column. For an overhead liquid product stream, the specification may be the desired percentage of some component in the overhead liquid product stream. Also, a desired ASTM end point may be specified for an overhead liquid product stream.

Many different methods have been proposed for controlling fractional distillation columns in such a manner that the overhead liquid product stream drawn from a fractional distillation column meets desired specifications. Where the desired specification is a ASTM end point, one method which has been utilized is the analysis of the overhead liquid product stream to determine the ASTM end point temperature of the overhead liquid product stream. Control of the fractional distillation column is then based on such an analysis. However, on many fractional distillation columns, it may be very difficult to actually measure the ASTM end point temperature of the overhead liquid product stream.

Even if analysis of the overhead liquid product stream is possible, measurement delays result from such analysis, particularly if the analysis must be carried out in a laboratory, and continuous control of the fractional distillation column is lost. Also, it is very difficult to maintain analyzers for measuring ASTM end point temperatures.

In a book entitled Distillation by Matther Van Winkle (1967 by McGraw-Hill and referred to hereinafter as "Van Winkle") a method for determining the ASTM end point temperature based on a knowledge of the slope of the ASTM boiling point curve (the form of which will be described more fully hereinafter) and the equilibrium flash vaporization (EFV) end point temperature is described. However, while the EFV end point temperature may be calculated based on process measurements such as pressures and temperatures, it has been found that the slope of the ASTM boiling point curve for the overhead liquid product from a fractional distillation column changes significantly and frequently over a period of time. Thus, without calculating the change in the slope of the ASTM boiling point curve, it is difficult to utilize the method described by Van Winkle to reliably calculate the ASTM end point of the overhead liquid product. However, because of the form of the ASTM boiling point curve, it is difficult to determine the changes in the slope of the ASTM boiling point curve.

It is thus an object of this invention to provide a method and apparatus for determining the change in the slope of the ASTM boiling point curve for the overhead liquid product from a fractional distillation column so as to provide a means for determining the actual ASTM end point temperature for the overhead liquid product from the fractional distillation column and thus provide a basis for maintaining a desired ASTM end point temperature for the overhead liquid product.

In accordance with the present invention, it has been found that changes in the slope of the EFV boiling point line (described more fully hereinafter) can be utilized to determine the actual slope of the ASTM boiling point curve at any particular time. A basis is thus provided for determining the actual ASTM end point temperature which may be utilized to control the fractional distillation process so as to maintain a desired ASTM end point temperature for the overhead liquid product from the fractional distillation process.

In general, the EFV boiling point line is used to calculate the actual slope of the ASTM boiling point curve at any particular time based on the finding that the slope of the ASTM boiling point curve will change in the same manner as the slope of the EFV boiling point line changes. Thus, the actual slope of the ASTM boiling point curve at a particular time $T_2$ can be determined by using a correction factor derived from the slope of the ASTM boiling point curve at an earlier time $T_1$ the slope of the EFV boiling point line at the time $T_1$ and the actual slope of the EFV boiling point line at the time $T_2$.

In order to determine changes in the slope of the EFV boiling point line, it is necessary to determine the EFV end point temperature and EFV initial point temperatures at different times. The hydrocarbon partial pressure at the top of the fractional distillation column and in the overhead accumulator are utilized to determine the EFV end point temperature and EFV initial point temperature. One factor utilized in the calculation of such hydrocarbon partial pressure is the moles of inerts contained in the overhead vapor and overhead vapor product as will be described more fully hereinafter. The moles of inerts contained in the overhead vapor and overhead vapor product can be estimated but, where the hydrogen concentration in the upper portion of the fractional distillation column or in the overhead accumulator is subject to change, it has been found that such estimations may not provide the desired accuracy. In accordance with the present invention, changes in hydrogen concentration are utilized to actually calculate the moles of inerts required for the calculation of hydrocarbon partial pressures.

FIG. 1 illustrates the basic form of the ASTM boiling point curve and the EFV boiling point line. FIG. 1 is intended to show only the basic form and is not intended to be representative of any actual ASTM curve or EFV line. As can be seen from FIG. 1, in contrast to the ASTM curve, the EFV line is a substantially straight line. Thus, it is possible to calculate the slope of EFV line by calculating the EFV end point temperature and the EFV initial point temperature. Again, the shape of the ASTM curve makes it difficult to calculate changes in the ASTM curve at a point such as the end point temperature.

Figure 2:
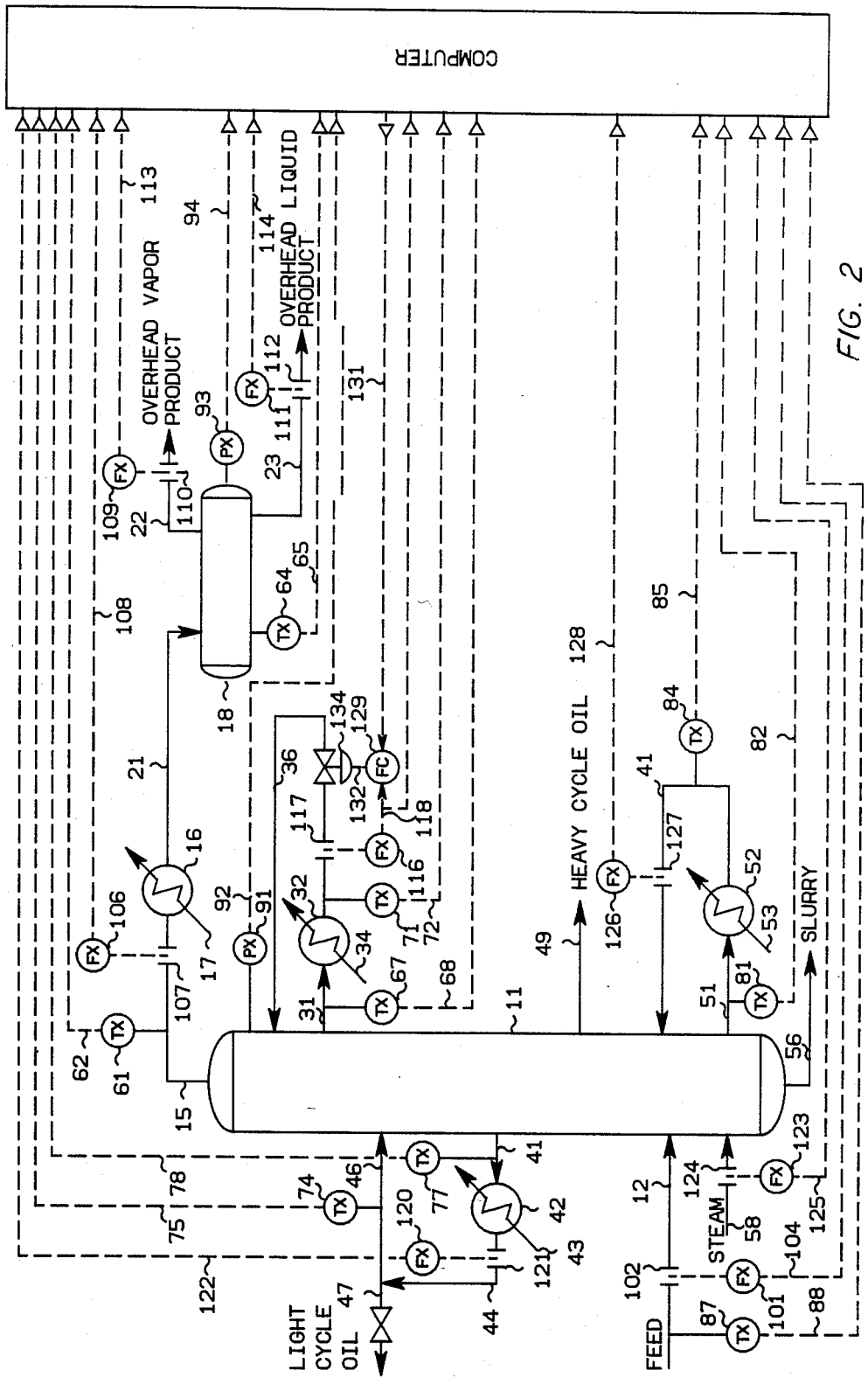
Figure 3:
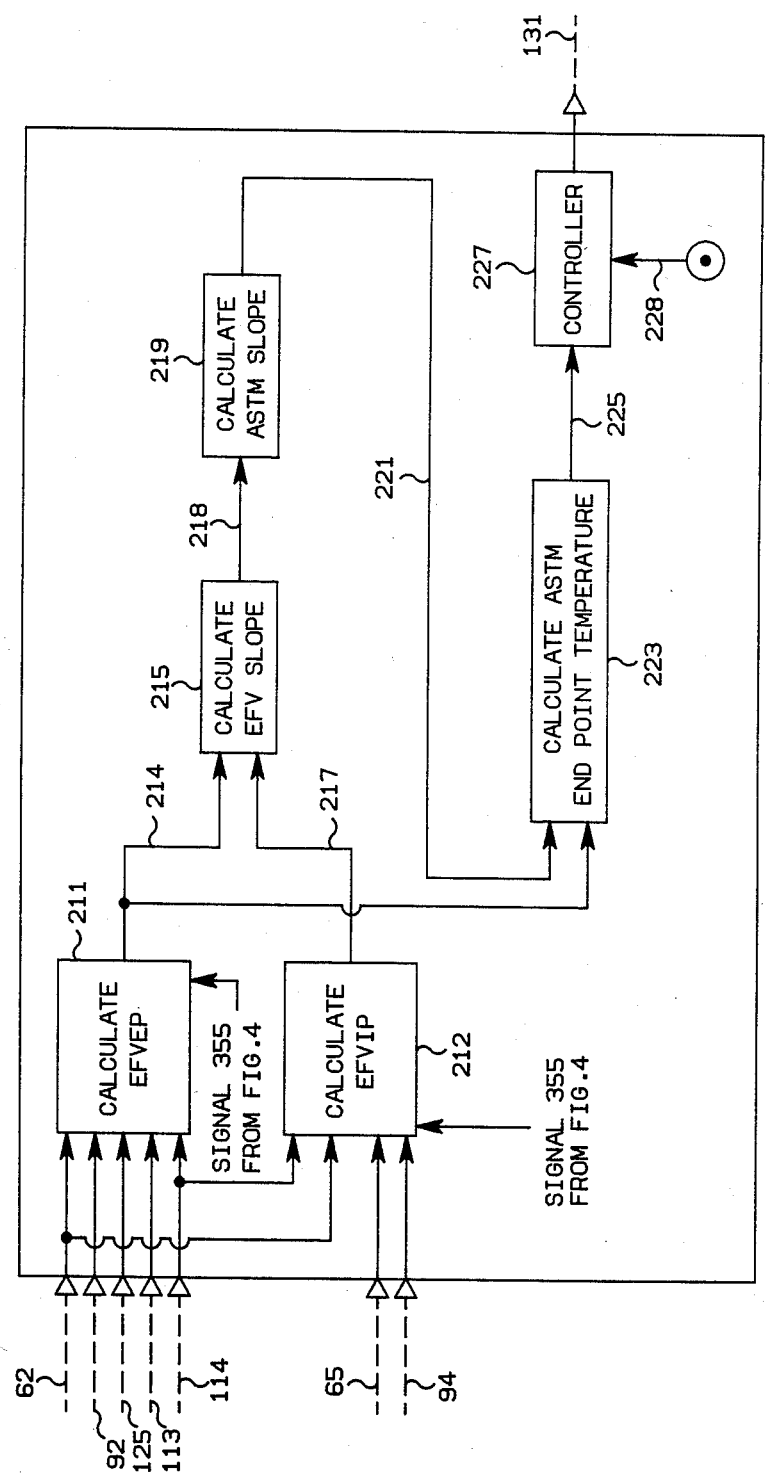
Figure 4:
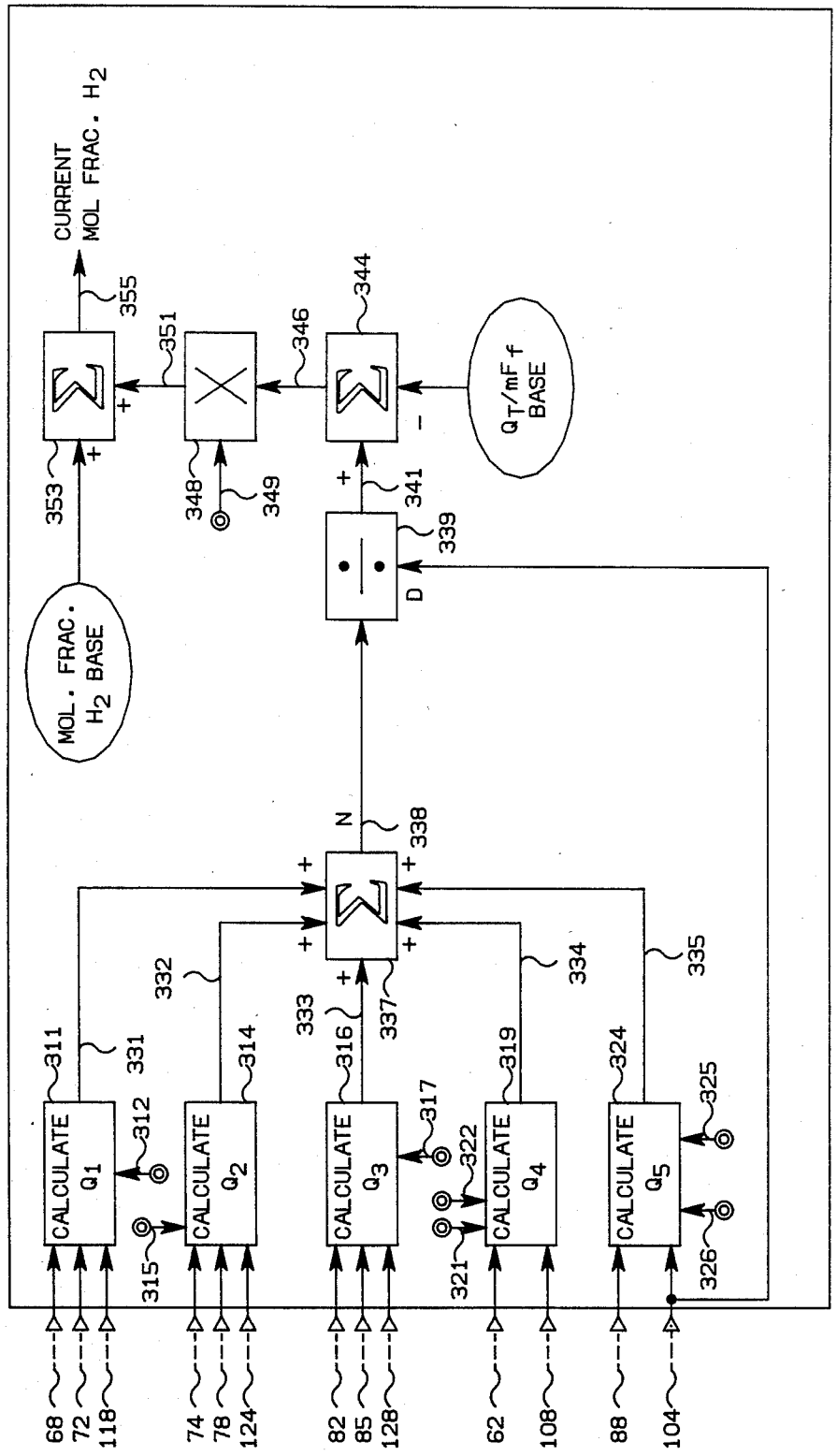

Other objects and advantages of the invention will be apparent from the foregoing brief description of the invention and the claims as well as the detailed description of the drawings which are briefly described as follows:

FIG. 1 is a simplified illustration of an ASTM boiling point curve and an EFV boiling point line;

FIG. 2 is an illustration of a fractional distillation column and the associated control system for maintaining a desired ASTM end point temperature; and FIG. 3 is a logic diagram for the computer logic utilized to generate the control signal utilized in the control of the ASTM end point temperature for the overhead liquid product stream withdrawn from the fractional distillation column illustrated in FIG. 2; and FIG. 4 is a logic diagram for the computer logic used to calculate the current mole fraction of hydrogen contained in the overhead vapor product.

The invention is illustrated and described in terms of a fractionating particular fractional distillation process feed. However, the invention is applicable to any fractional distillation process in which it is desired to control the ASTM end point temperature of the overhead liquid product withdrawn from the fractional distillation process.

A specific control system configuration is set forth in FIG. 2 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in the control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combination of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 2, there is illustrated a fractional distillation column 11 which is utilized to fractionate a feed into a variety of products. The feed is supplied to the fractional distillation column 11 through conduit means 12. The feed will have generally been preheated prior to entering the fractional distillation column 11.

An overhead stream is provided from the fractional distillation column 11 through conduit means 15 to the heat exchanger 16. The heat exchanger 16 is provided with a cooling medium flowing through conduit means 17. A fluid stream from the heat exchanger 16 is provided to the overhead accumulator 18 through conduit means 21. Vapor in the overhead accumulator 18 is withdrawn from the overhead accumulator through conduit means 22 and is generally referred to as the overhead vapor product. Liquid in the overhead accumulator 18 is withdrawn from the overhead accumulator through conduit means 23 and is generally referred to as the overhead liquid product.

The overhead vapor product will typically contain hydrogen, nitrogen and hydrocarbons containing as many as fourteen carbon atoms. Some of the hydrocarbons are considered a part of the overhead liquid product or, stated differently, these hydrocarbons would have been removed in the overhead liquid product if a perfect separation were obtainable in the overhead accumulator 18. Other hydrocarbons (lights) are considered inerts. As used herein, the term "inerts" refers to gases such as hydrogen and nitrogen contained in the overhead vapor product (these gases will also be present at the top of the fractional distillation column 11) and the light hydrocarbons. Preferably, $C_4$ and lighter are considered inerts but this division is arbitrary and other divisions could be made if desired.

Calculations discussed in later parts of this specification refer to hydrocarbon partial pressures and molecular weights of hydrocarbons. These terms, as used herein, do not include inerts although the inerts will typically include some hydrocarbons.

On many fractional distillation columns, a portion of the overhead liquid product withdrawn through conduit means 23 would be returned to the fractional distillation column as an upper external reflux. However, on the tower to which the present invention was applied, a fluid stream withdrawn from a lower portion of the fractional distillation column 11 through conduit means 31 was utilized as the upper external reflux. In either case, the purpose is the same and in both cases the fluid streams would be referred to as the upper external reflux.

The fluid stream flowing through conduit means 31 is provided to the heat exchanger 32. The heat exchanger 32 is also provided with a cooling medium flowing through conduit means 34. The fluid stream from the heat exchanger 32 is provided to the top of the fractional distillation column 11 through conduit means 36.

A center reflux is withdrawn from a central portion of the fractional distillation column 11 through conduit means 41. The fluid flowing through conduit means 41 is provided to the heat exchanger 42. The heat exchanger 42 is provided with a cooling medium flowing through conduit means 43. The fluid stream from the heat exchanger 42 is withdrawn through conduit means 44. A portion of the fluid flowing through conduit means 44 is recycled through conduit means 46 to the central portion of the fractional distillation column 11 as a center reflux. The remaining portion of the fluid flowing through conduit means 44 is withdrawn through conduit means 47 as a light cycle oil.

A heavy cycle oil is withdrawn from the fractional distillation column 11 through conduit means 49.

A bottom reflux is withdrawn from a lower portion of the fractional distillation column 11 through conduit means 51. The fluid flowing through conduit means 51 is provided to heat exchanger 52. The heat exchanger 52 is provided with a cooling medium floating through conduit means 53. The fluid stream from the heat exchanger 52 is recycled through conduit means 54 as a bottoms reflux to the fractional distillation column 11.

A bottoms stream generally containing slurry is withdrawn from the fractional distillation column 11 through conduit means 56. Steam is provided as a stripping fluid to the fractional distillation column 11 through conduit means 58. It is noted that, in many cases, heat would be provided to the fractional distillation column by a fired reboiler or by circulating steam through conduits in the fractional distillation column.

for the sake of simplicity, other process streams which would be associated with a distillation process have not been illustrated since they play no part in the invention. Also, the many pumps, additional heat exchangers, additional control components and other typical fractional distillation equipment have not been illustrated.

The manner in which various process variables are measured and the results of the measurements provided to a computer is as follows:

Temperature transducer 61 in combination with a temperature measuring device such as a thermocouple, which is operably located in conduit means 15, provides an output signal 62 which is representative of the temperature of the overhead stream flowing through conduit means 15. Signal 62 is provided from the temperature transducer 61 as an input to computer 100. It is again noted that transducing of signal 62 would be required but such transducing has not been illustrated for the sake of simplicity.

In like manner, temperature transducer 64 in combination with a temperature measuring device such as a thermocouple, which is operably located in the overhead accumulator 18, provides an output signal 65 which is representative of the actual temperature of the fluid in the overhead accumulator 18. Temperature transducer 67 in combination with a temperature measuring device such as a thermocouple, which is operably located in conduit means 31, provides an output signal 68 which is representative of the actual temperature of the fluid flowing through conduit means 31. Temperature transducer 71 in combination with a temperature measuring device such as a thermocouple, which is operably located in conduit means 36, provides an output signal 72 which is representative of the actual temperature of the fluid flowing through conduit means 36. Temperature transducer 74 in combination with a temperature measuring device such as a thermocouple, which is operably located in conduit means 46, provides an output signal 75 which is representative of the actual temperature of the fluid flowing through conduit means 46. Temperature transducer 77 in combination with a temperature measuring device such as a thermocouple, which is operably located in conduit means 41, provides an output signal 78 which is representative of the actual temperature of the fluid flowing through conduit means 41. Temperature transducer 81 in combination with a temperature measuring device such as thermocouple which is operably located in conduit means 51, provides an output signal 82 which is representative of the actual temperature of the fluid flowing through conduit means 51. Temperature transducer 84 in combination with a temperature measuring device such as a thermocouple, which is operably located in conduit means 54, provides an output signal 85 which is representative of the actual temperature of the fluid flowing through conduit means 54. Temperature transducer 87 in combination with a temperature measuring device such as a thermocouple, which is operably located in conduit means 12, provides an output signal 88 which is representative of the actual temperature of the feed flowing through conduit means 12. Signals 65, 68, 72, 75, 78, 82, 85 and 88 are provided as inputs to computer 100.

Pressure transducer 91 in combination with a pressure sensing device, which is operably located in the upper portion of the fractional distillation column 11, provides an output signal 92 which is representative of the actual pressure in the upper portion of the fractional distillation column 11. Signal 92 is provided from the pressure transducer 91 as an input to computer 100.

In like manner, pressure transducer 93 in combination with a pressure sensing device, which is operably located in the overhead accumulator 18, provides an output signal 94 which is representative of the actual pressure in the overhead accumulator 18. Signal 94 is provided from the pressure transducer 93 as an input to computer 100.

Flow transducer 101 in combination with the flow sensor 102, which is operably located in conduit means 12, provides an output signal 104 which is representative of the actual flow rate of the feed through conduit means 12. Signal 104 is provided from the flow transducer 101 as an input to computer 100.

In like manner, flow transducer 106 in combination with flow sensor 107, which is operably located in conduit means 15, provides an output signal 108 which is representative of the actual flow rate of the overhead stream through conduit means 22. Flow transducer 111 in combination with flow sensor 112, which is operably located in conduit means 23, provides an output signal 114 which is representative of the actual flow rate of the overhead liquid product through conduit means 23. Flow transducer 109 in combination with flow sensor 110, which is operably located in conduit means 22, provides an output signal 113 which is representative of the actual flow rate of the overhead vapor product through conduit means 22. Flow transducer 116 in combination with the flow sensor 117, which is operably located in conduit means 36, provides an output signal 118 which is representative of the actual flow rate of the fluid flowing through conduit means 36. Flow transducer 120 in combination with a flow sensor 121, which is operably located in conduit means 44, provides an output signal 122 which is representative of the actual flow rate of the fluid flowing through conduit means 44. Flow transducer 123 in combination with the flow sensor 124, which is operably located in conduit means 58, provides and output signal 125 which is representative of the actual flow rate of the steam flowing through conduit means 58. Flow transducer 126 in combination with the flow sensor 127, which is operably located in conduit means 54, provides an output signal 128 which is representative of the actual flow rate of the fluid flowing through conduit means 54. Signals 108, 113, 114, 118, 122, 125 and 128 are provided as inputs to computer 100. In addition signal 118 is provided as the process variable input to flow controller 129.

In response to the described process variables, computer 100 calculates the flow rate of the upper external reflux required to maintain the actual ASTM end point temperature of the overhead liquid product flowing through conduit means 23 substantially equal to a desired ASTM end point temperature. Signal 131, which is representative of this desired flow rate, is provided from computer 100 as the set point input to the flow controller 129.

In response to signals 118 and 131, the flow controller 129 provides an output signal 132 which is scaled so as to be representative of the position of the control valve 134, which is operably located in conduit means 36, required to maintain the actual flow rate of the upper external reflux through conduit means 36 substantially equal to the desired flow rate represented by signal 131. Signal 132 is provided from the flow controller 129 as the control signal for the control valve 134 and the control valve 134 is manipulated in response thereto.

The logic utilized to calculate the magnitude of the set point signal 131 based on the process variables measured is illustrated in FIG. 3. Referring now to FIG. 3, signal 62, which is representative of the temperature of the overhead vapor stream flowing through conduit means 15, is provided as an input to the calculate equilibrium flash vaporization end point (EFVEP) block 211. In like manner, signal 92, which is representative of the actual pressure in the upper portion of the fractional distillation column 11, signal 114, which is representative of the actual flow rate of the overhead liquid product through conduit means 39, and signal 113, which is representative of actual flow rate of the overhead vapor product through conduit means 22, are provided as inputs to the calculate EFVEP block 211. Signals 62 and 114 are also provided as inputs to the calculate equilibrium flash vaporization initial point (EFVIP) block 212.

The EFVEP for the overhead liquid product is calculated in response to the described process variables as follows:

The hydrocarbon partial pressure (HPP) at the top of the fractional distillation column 11 is given by equation (1)

$$HPP = \frac{(\text{Moles } H) \times (P_1)}{\text{Moles } H + \text{Moles } I_1} \qquad (1)$$

where
Moles H = the moles of hydrocarbon contained in the overhead vapor (top of fractional distillation column 11);
$P_1$ = the total pressure in the upper portion of the fractional distillation column 11 (signal 92); and
Moles $I_1$ = the moles of inerts contained in the overhead vapor (top of fractional distillation column 11).

Moles H is given by equation (2)

$$\text{Moles H} = \left(\frac{F_{olp}}{\text{Mol. Wt OLP}}\right) + \tag{2}$$

$$\left(\frac{F_{ovp}}{359}\right)(1 - (\text{Mol. Frac. C}_4 + \text{Mol. Frac. H}_2))$$

where
- $E_{olp}$ = the flow rate of the overhead liquid product stream (signal 114);
- Mol. Wt OLP = Molecular weight of the hydrocarbons contained in the overhead liquid product;
- $F_{ovp}$ = the flow rate of the overhead vapor product stream (signal 113);
- Mol. Frac. C$_4$ = the mole fraction of hydrocarbons containing 4 carbon atoms and less contained in the overhead vapor product; and
- Mol. Frac. H$_2$ = the mole fraction of hydrogen contained in the overhead vapor product.

It is noted that all flow rates used in the calculations described with respect to FIGS. 3 and 4 will be mass flow rates. However, since the conversion from measured flow rates to mass flow rates is conventional, such conversion is not described in detail.

The molecular weight of the hydrocarbons contained in the overhead liquid product may be calculated by any conventional technique. The molecular weight of the hydrocarbons is preferably calculated as a function of the mean average boiling point and gravity of hydrocarbons using the NGPSA Engineering Data Book published by the Natural Gas Processors Suppliers Association, 9th Edition, pages 16-25, 1972. Initial estimates of the mean average boiling point and gravity are obtained from laboratory analysis of typical products. The mean average boiling point and gravity can be periodically updated from laboratory data. The mean average boiling point will typically be in the range of from about 200° to about 280° F. The gravity will typically be in the range of about 55° to about 75° API.

The manner in which Mol Frac H$_2$ is calculated is illustrated in FIG. 4. Referring now to FIG. 4, it is first noted that it is necessary to calculate the total heat being removed in the fractional distillation process per unit (generally pound) of feed. This is accomplished by performing a heat balance.

The heat removed (Q) by any specific loop of the fractional distillation process, such as the upper external reflux loop, is given by Equation (3)

$$Q = (MF)(C_p)(\Delta T) \tag{3}$$

where
- MF = the mass flow rate of the fluid flowing through the loop;
- $C_p$ = the specific heat of the fluid flowing through the loop; and
- $\Delta T$ = the differential temperature across a heat exchanger such as heat exchanger 32.

To perform a heat balance for the fractional distillation column, it is necessary to consider the heat removed by the heat exchanger 32, the heat exchanger 42 and the heat exchanger 52. It is also desirable to compensate for temperature changes in the feed or temperature changes in the overhead stream to prevent such changes from affecting the heat removal calculation. Thus, there are five components to the heat balance.

These five components are referred to in FIG. 4 as $Q_1$, $Q_2$, $Q_3$, $Q_4$, and $Q_5$.

$Q_1$ is calculated in block 311. Signal 68, which is representative of the temperature of the fluid flowing through conduit means 31 is provided as an input to block 311. Also, signal 72, which is representative of the temperature of the fluid flowing through conduit means 36, and signal 118, which is representative of the flow rate of the upper external reflux are provided as inputs to block 311.

Block 311 is also provided with signal 312 which is representative of the specific heat of the upper external reflux.

$Q_1$, which is representative of the heat removed by the upper external reflux, is calculated in accordance with Equation (4)

$$Q_1 = (MF_1)(C_{p1})(T_1 - T_2) \tag{4}$$

where
- $MF_1$ = the mass flow rate of the upper external reflux (signal 118 converted to a mass flow rate);
- $C_{p1}$ = the specific heat of the upper external reflux (signal 312);
- $T_1$ = the temperature of the upper external reflux withdrawn from the fractional distillation column through conduit means 31 (signal 68); and
- $T_2$ = the temperature of the upper external reflux returned to the fractional distillation column 11 through conduit means 36 (signal 72).

In like manner, $Q_2$, which is representative of the heat removed by the center reflux, is calculated in block 314 in accordance with Equation (5)

$$Q_2 = (MF_2)(C_{p2})(T_3 - T_4) \tag{5}$$

where
- $MF_2$ = the flow rate of the center reflux withdrawn from fractional distillation column 11 (signal 122 converted to a mass flow rate);
- $C_{p2}$ = the specific heat of the center reflux (signal 315);
- $T_3$ = the temperature of the center reflux withdrawn from the fractional distillation column 11 (signal 78); and
- $T_4$ = the temperature of the center reflux returned to the fractional distillation column 11 (signal 75).

Also in like manner, $Q_3$, which is representative of the heat removed by the bottoms reflux, is calculated in block 316 in accordance with Equation (6).

$$Q_3 = (MF_3)(C_{p3})(T_5 - T_6) \tag{6}$$

where
- $MF_3$ = the flow rate of the bottoms reflux (signal 128 converted to a mass flow rate);
- $C_{p3}$ = the specific heat of the bottoms reflux (signal 317);
- $T_5$ = the temperature of the bottoms reflux withdrawn from the fractional distillation column 11 (signal 82); and
- $T_6$ = the temperature of the bottoms reflux returned to the fractional distillation column 11 (signal 85).

If the temperature of the feed and the overhead stream did not change, only $Q_1$, $Q_2$ and $Q_3$ would be required to determine the heat removed by the fractional distillation process. However, these temperatures may change and it is desirable to not allow such changes to affect the heat removal calculation. This is accomplished by determining an average temperature for the feed and for the overhead stream and using this average temperature to determine a $\Delta T$ for the feed and for the overhead stream.

$Q_4$, which is representative of the affect of a change in the temperature of the overhead stream from an average temperature on the heat balance, is calculated in block 319 in accordance with Equation (7).

$$Q_4 = (MF_4)(C_{p4})(T_7 - T_{oa}) \quad (7)$$

where $MF_4$ = the flow rate of the overhead stream (signal 108 converted to a mass flow rate);

$C_{p4}$ = the specific heat of the overhead stream which will be a vapor (signal 321);

$T_7$ = the actual temperature of the overhead stream (signal 62); and $T_{oa}$ = the average temperature of the overhead stream (signal 322).

In like manner, $Q_5$, which is representative of the affect on the heat balance of a change in the temperature of the feed, is calculated in accordance with Equation (8)

$$Q_5 = (MF_f)(C_{p5})(T_8 - T_{fa}) \quad (8)$$

where $MF_f$ = the flow rate of the feed (signal 104 converted to a mass flow rate);

$C_{p5}$ = the specific heat of the feed (signal 325);

$T_8$ = the actual temperature of the feed (signal 88); and $T_{fa}$ = the average temperature of the feed (signal 326).

Signals 331–335, which are representative of $Q_1$–$Q_5$ respectively, are provided to the summing block 337 and are summed to established signal 338 which is representative of the total heat removed by the fractional distillation process ($Q_T$). Signal 338 is provided from the summing block 337 as the numerator input to the dividing block 339.

Signal 104, which is representative of the actual flow rate of the feed, is provided to the denominator input of the dividing block 339. Signal 338 is divided by signal 104 (converted to a mass flow rate, $MF_f$) to establish signal 341 which is representative of $Q_T/MF_f$. Signal 341 is provided from the dividing block 339 to the minuend input of the summing block 344.

The magnitude of signal 341 is calculated periodically (preferably every fifteen seconds). For one calculation of $Q_T/MF_f$ at a time T, an analysis is made to determine the actual mole fraction of hydrocarbons containing 4 carbon atoms and less (Mol. Frac. $C_4$) and the actual mole fraction of hydrogen contained in the overhead vapor product at time T (Mol. Frac. $H_2$). These values are referred to hereinafter as the base values for Mol. Frac. $C_4$ and Mol. Frac. $H_2$. $Q_T/MF_f$ at time T is also referred to as the base $Q_T/MF_f$. The base $Q_T/MF_f$ is supplied to the subtrahend input of the summing block 344. This value is retained in memory in the computer.

The value of $Q_T/MF_f$ base is subtracted from the current value of $Q_T/MF_f$ to establish signal 346 which is representative of any change which has occurred in $Q_T/MF_f$ since the base calculation at time T. Signal 346 is provided from summing block 344 as an input to the multiplying block 348.

The multiplying block 348 is also supplied with signal 349 which is representative of a constant which can be utilized to convert signal 346 from a change in $Q_T/MF_f$ to a change in hydrogen concentration in the overhead vapor product (also upper portion of the fractional distillation column 11 or the overhead vapor) which is represented by signal 351. Signal 349 is established by actually analyzing the overhead vapor to determine the hydrogen concentration at particular times when $Q_T/MF_f$ is calculated. A correlation can be derived by comparing actual measured changes in the hydrogen concentration to the changes in $Q_T/MF_f$ which occur during the time period that was required for the change in hydrogen concentration. Once the value of signal 349 is established, it will typically not change over long periods of time. The actual value used for signal 349 in this preferred embodiment was 0.0003. Signal 351 is supplied as a first input to the summing block 353.

The summing block 353 is also supplied with the base value of Mol. Frac. $H_2$ which has previously been described and which is retained in memory. Signal 351 is summed with Mol. Frac. $H_2$ base to establish signal 355 which is representative of the current value of Mol. Frac. $H_2$. Signal 355 is utilized in Equation (2) and to calculate Moles $I_1$ and Moles $I_2$ as will be described more fully hereinafter.

It has been found that the basic factor which causes changes in Mol. Frac. $C_4$ is the temperature in the overhead accumulator 18. Thus, a relationship can be established between the temperature in the overhead accumulator 18 and the actual Mol. Frac. $C_4$. This is accomplished by actual analysis of Mol. Frac. $C_4$ at different overhead accumulator temperatures. For this preferred embodiment, Mol. Frac. $C_4$ was given by equation (9)

$$\text{Mol. Frac. } C_4 = \frac{(\text{Mol. Frac. } C_4 \text{ Base} - 0.19(OHT - 95))}{100} \quad (9)$$

where

Mol. Frac. $C_4$ Base = the base Mol. Frac. $C_4$ determined as previously described; and OHT = the temperature in the overhead accumulator 18 (signal 65).

Moles $I_1$ is given by equation (10)

$$\text{Moles } I_1 = F_{ovp}(\text{Mol. Frac. } C_4 + \text{Signal 355}) \frac{+F_s}{\text{Mol Wt Steam}} \quad (10)$$

where $F_s$ = flow rate of steam (signal 125);

Mol Wt Steam = molecular weight of steam (known value); and $F_{ovp}$, Mol. Frac. $C_4$ and Signal 355 are as previously defined.

The EFVEP is equal to the boiling point of normal paraffin hydrocarbons at 760 millimeters of mercury absolute pressure. The EFVEP is calculated from FIG. 5-27; page 208, of a book entitled Petroleum Refinery Engineering by W. L. Nelson (1958, McGraw-Hill Book Company and referred to hereianfter as "Nelson"). When using FIG. 5-27, the vapor pressure of FIG. 5-27 is equal to the hydrocarbon partial pressure calculated in accordance with equation (1).

The temperature required for use of FIG. 5-27 to calculate the EFVEP is the temperature of the overhead vapor stream flowing through conduit means 15 (signal 62). Using the hydrocarbon partial pressure determined in accordance with equation (1) and the measured temperature of the overhead vapor stream flowing through conduit means 15, the EFVEP may be determined directly from FIG. 5-27 of Nelson.

FIG. 5-27 is entered into the computer by entering sets of related numbers for the partial pressure, temperature and boiling point. A regression analysis is then used to interpolate between the entered points to achieve the desired accuracy.

In addition to the previously described process variables which are provided to the calculate EFVIP block 212, signal 65, which is representative of the actual temperature of the fluid in the overhead accumulator 18, is provided as an input to the EFVIP block 212. Also, signal 94, which is representative of the actual pressure in the overhead accumulator 18, is provided as an input to the calculate EFVIP block 212.

The EFVIP is calculated in exactly the same manner as previously described for the EFVEP except that the pressure used is the pressure in the overhead accumulator (signal 94) as opposed to the pressure in the upper portion of the fractional distillation column and the temperature used is the temperature of the fluid in the overhead accumulator (signal 65) as opposed to the temperature of the overhead vapor stream flowing through conduit means 15. Also, Moles $I_2$ (the moles of inerts contained in the overhead vapor product) is used to calculate the EFVIP. Again, the EFVIP may be derived directly from FIG. 5-27 of Nelson based on the hydrocarbon partial pressure in the overhead accumulator 18 determined as described above.

Moles $I_2$ is calculated in accordance with Equation 10 except that the steam term is dropped since all steam is condensed. It is noted that, if a steam stripping stream is not provided to the fractional distillation column, the Moles $I_1$ will be equal to Moles $I_2$.

Signal 214, which is representative of the actual EFVEP of the overhead liquid product is provided from the calculate EFVEP block 211 as an input to the calculate EFV slope block 215. In like manner, signal 217, which is representative of the actual EFVIP of the overhead liquid product, is provided from the calculate EFVIP block 212 as an input to the calculate EFV slope block 215.

The slope of the EFV line formed by drawing a straight line between the EFVEP and EFVIP, as illustrated in FIG. 1, is given by equation (11)

$$\text{Slope} = \frac{EFVEP - EFVIP}{100} \quad (11)$$

The slope calculated in accordance with equation (11), which is represented by signal 218, is provided from the calculate EFV slope block 215 as an input to the calculate ASTM slope block 219.

An initial estimate of the slope of the ASTM boiling point curve, such as the curve illustrated in FIG. 1, at a particular point such as the 100 percent end point, is obtained from laboratory analysis of typical samples. The slope of the ASTM curve will generally be in the range of about 2° F./% to about 4° F./%. Typical values of the slope of the EFV line are in the range of about 1° F./% to about 3° F./%. Initial estimates of the ASTM slope and the EFV slope are utilized to initiate the calculations but are not utilized thereafter.

The slope of the ASTM curve at a time $T_2$ (ASTM Slope ($T_2$)) at a particular point such as the end point is given by equation (12)

$$\text{ASTM Slope }(T_2) = \text{ASTM Slope }(T_1) \times \frac{EFV \text{ Slope }(T_2)}{EFV \text{ Slope }(T_1)} \quad (12)$$

where
ASTM Slope ($T_1$)=the slope of the ASTM curve at a time $T_1$ which is earlier in time than the time $T_2$;
EFV Slope ($T_2$)=the slope of the EFV line at time $T_2$; and
EFV Slope ($T_1$)=the slope of the EFV line at time $T_1$.

In practice, a new ASTM slope is calculated periodically. The period will be the difference between times $T_1$ and $T_2$. Essentially, the last calculated value for the ASTM slope (ASTM Slope ($T_1$)) is updated based the new calculated value for the EFV slope (EFV Slope ($T_2$)). This procedure continues on a periodic basis. Thus an updated ASTM slope is available for use in calculating the ASTM end point temperature as will be described more fully hereinafter.

Signal 221, which is representative of ASTM Slope ($T_2$) is provided from the calculate ASTM slope block 219 as an input to the calculate ASTM end point temperature block 223.

The ASTM Slope ($T_2$) is utilized to derive a correction factor for the EFV end point temperature which is represented by signal 214. This is accomplished by using FIG. 3.27 at page 147 of Van Winkle. Based on the ASTM Slope ($T_2$) and the end point, the correction factor can be derived directly from FIG. 3.27. This correction factor is added to signal 214 to derive what will be referred to as a corrected EFV end point temperature.

This corrected EFV end point temperature may be utilized to derive the ASTM end point temperature directly using FIG. 3.26 at page 146 of Van Winkle which illustrates the relationship between the ASTM temperature and the EFV uncorrected temperature.

FIG. 3-27 of Van Winkle is entered into the computer by entering related numbers of the ASTM Slope and the Correction to EFV Temperature. FIG. 3-26 of Van Winkle is entered into the computer by entering related numbers for ASTM Temperature and EFV Temperature. Again, a regression analysis is used to interpolate for the desired accuracy.

Signal 225, which is representative of the actual ASTM end point temperature of the overhead liquid product is provided from the calculate ASTM end point temperature block 223 as the process variable input to the controller block 227.

The controller block 227 is also provided with a set point signal 228 which is representative of the desired ASTM end point temperature for the overhead liquid product. In response to signals 225 and 228 the controller block 227 provides an output signal 131 which is scaled so as to be representative of the flow rate of the upper external reflux flowing through conduit means 36 required to maintain the actual ASTM end point temperature of the overhead liquid product substantially equal to the desired end point temperature represented by signal 228. Signal 131 is provided as an output from computer 100 and is utilized as is previously described.

It is noted that, while signal 131 is preferably scaled so as to be representative of the flow rate of the upper external reflux, signal 131 could be scaled so as to be representative of the position of the control valve 134 required to maintain the desired ASTM end point temperature for the overhead liquid product. If this were done, there would be no need for the level of control represented by the flow controller 129 and the flow transducer 116, illustrated in FIG. 2. However, some accuracy may be lost in directly manipulating the control valve 134 in response to signal 131 and it is thus preferred to utilize the level of control as described above.

In summary, based on the process variables associated with a fractional distillation process, the amount of heat being removed per unit of feed at any particular time is determined. This heat removal determination is utilized to calculate the actual moles of hydrocarbon contained in the overhead vapor (Moles H), the actual moles of inerts in the upper portion of the fractional distillation column (Moles $I_1$) and the actual moles of inerts in the overhead vapor product (Moles $I_2$). The actual moles of hydrocarbon and of inerts in conjunction with other process variables associated with the fractional distillation process are utilized to calculate changes in the slope of the EFV boiling point line. These changes may be utilized to update the slope of the ASTM boiling point curve periodically. The slope of the ASTM boiling point curve is utilized to determine the actual, current ASTM end point temperature of the overhead liquid product and this actual determination is utilized to control the fractional distillation process so as to maintain the actual ASTM end point temperature substantially equal to a desired ASTM end point temperature as set by product specifications for the overhead liquid product.

The invention has been described in terms of a preferred embodiment as illustrated in FIGS. 1-4. Specific components used in the practice of the invention as illustrated in FIG. 2 such as flow sensors 107, 112, 117, 121, 102 and 127; flow transducers 106, 111, 116, 120, 101 and 126; temperature transducers 61, 64, 67, 71, 74, 77, 87, 81 and 84; pressure transducers 91 and 93 and control valve 134 are each well-known, commercially available control components such as are described in length in Perry's Chemical Engineers Handbook, 4th Ed., Chapter 22, McGraw-Hill.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a fractional distillation column;
   means for providing a feed stream containing hydrocarbons and inerts including hydrogen to said fractional distillation column;
   a cooling means;
   an overhead accumulator;
   means for withdrawing an overhead vapor stream from an upper portion of said fractional distillation column and for passing said overhead vapor stream through said cooling means to said overhead accumulator;
   means for withdrawing a vapor stream from said overhead accumulator as an overhead vapor product;
   means for withdrawing a liquid stream from said overhead accumulator as an overhead liquid product;
   means for providing an upper external reflux to said fractional distillation column;
   means for establishing a first signal representative of the heat removed per unit of said feed stream by said fractional distillation column at a time $T_2$;
   means for establishing a second signal representative of the heat removed per unit of said feed stream by said fractional distillation column at a time $T_1$ which is earlier in time than said time $T_2$;
   means for establishing a third signal representative of the change in heat removed per unit of said feed stream by said fractional distillation column between said time $T_2$ and time $T_1$;
   means for establising a fourth signal representative of any change in the hydrogen concentration in said overhead vapor stream between said time $T_2$ and said time $T_1$ in response to said third signal;
   means for establishing a fifth signal representative of the actual moles of inerts contained in said overhead vapor stream at said time $T_2$ in response to said fourth signal;
   means for establishing a sixth signal representative of the actual moles of hydrocarbon contained in said overhead vapor stream in response to said fourth signal;
   means for establishing a seventh signal representative of the hydrocarbon partial pressure in the upper portion of said fractional distillation column in response to said fifth and sixth signals;
   means for establishing an eighth signal representative of the equilibrium flash vaporization end point temperature (EFVEP) at said time $T_2$ for said overhead liquid product in response to said seventh signal;
   means for establishing a ninth signal representative of the actual moles of inerts in said overhead vapor stream at said time $T_2$ in response to said fourth signal;
   means for establishing a tenth signal representative of the hydrocarbon partial pressure in said overhead accumulator in response to said ninth signal and said sixth signal;
   means for establishing an eleventh signal representative of the equilibrium flash vaporization initial point temperature (EFVIP) for said overhead liquid product at said time $T_2$ in response to said tenth signal;
   means for establishing a twelfth signal representative of the slope of the equilibrium flash vaporization boiling point line for said overhead liquid product at said time $T_2$ in response to said eighth signal and said eleventh signal;
   means for establishing a thirteenth signal representative of the actual slope of the ASTM boiling point curve for said overhead liquid product at said time $T_2$ in response to said twelfth signal;
   means for establishing a fourteenth signal representative of the actual ASTM end point temperature for said overhead liquid product in response to said thirteenth signal;
   means for establishing a fifteenth signal representative of the desired ASTM end point temperature for said overhead liquid product stream;
   means for comparing said fourteenth signal and said fifteenth signal and for establishing a sixteenth signal which is responsive to the difference between said fourteenth signal and said fifteenth signal; and means for manipulating the flow rate of said upper external reflux to said fractional distillation column in response to said sixteenth signal to thereby maintain the actual ASTM end point temperature of said overhead liquid product substantially equal to the desired ASTM end point temperature represented by said fifteenth signal.

2. Apparatus in accordance with claim 1 wherein said means for establishing said fourth signal in response to said third signal comprises means for multiplying said third signal by a constant representative of the change in hydrogen concentration in said overhead vapor stream which occurs per unit change in the heat removed from said fractional distillation column to establish said fourth signal.

3. Apparatus in accordance with claim 2 wherein steam is supplied as a stripping stream to said fractional distillation column and wherein said means for establishing said fifth signal in response to said fourth signal comprises:
- means for establishing a seventeenth signal representative of the mole fraction of hydrocarbons containing four carbon atoms or less in said overhead vapor product;
- means for establishing an eighteenth signal representative of the mole fraction of hydrogen in said overhead vapor stream at said time $T_1$;
- means for establishing a nineteenth signal representative of the flow rate of said overhead vapor product;
- means for multiplying said nineteenth signal by the sum of said seventeenth, eighteenth and fourth signals to establish a twentieth signal;
- means for establishing a twenty-first signal representative of the actual flow rate of steam to said fractional distillation column;
- means for dividing said twenty-first signal by the molecular weight of steam to establish a twenty-second signal; and
- means for summing said twentieth signal and said twenty-second signal to establish said fifth signal.

4. Apparatus in accordance with claim 3 wherein said means for establishing said sixth signal comprises:
- means for adding said fourth signal to said eighteenth signal to establish a twenty-third signal representative of the actual mole fraction of hydrogen in said overhead vapor stream;
- means for summing said seventeenth signal and said twenty-third signal to establish a twenty-fourth signal;
- means for subtracting said twenty-fourth signal from 1 to establish a twenty-fifth signal;
- means for multiplying said twenty-fifth signal by said nineteenth signal converted to pound moles to establish a twenty-sixth signal;
- means for establishing a twenty-seventh signal representative of the actual flow rate of said overhead liquid product;
- means for establishing a twenty-eighth signal representative of the molecular weight of the hydrocarbon contained in said overhead liquid product;
- means for dividing said twenty-seventh signal by said twenty-eighth signal to establish a twenty-ninth signal; and
- means for summing said twenty-sixth signal and said twenty-ninth signal to establish said sixth signal.

5. Apparatus in accordance with claim 4 wherein said means for establishing said seventh signal comprises:
- means for establishing a thirtieth signal representative of the actual pressure in the upper portion of said fractional distillation column;
- means for multiplying said thirtieth signal by said sixth signal to establish a thirty-first signal; and
- means for dividing said thirty-first signal by the sum of said fifth signal and said sixth signal to establish said seventh signal.

6. Apparatus in accordance with claim 1 wherein said means for establishing said eighth signal in response to said seventh signal comprises:
- means for establishing a seventeenth signal representative of the actual temperature of said overhead vapor stream at said time $T_2$; and
- means for establishing said eighth signal in response to said seventh signal and said seventeenth signal.

7. Apparatus in accordance with claim 2 wherein said means for establishing said ninth signal in response to said fourth signal comprises:
- means for establishing a seventeenth signal representative of the mole fraction of hydrocarbons containing four carbon atoms or less in said overhead vapor product;
- means for establishing an eighteenth signal representative of the mole fraction of hydrogen in said overhead vapor stream at said time $T_1$;
- means for establishing a nineteenth signal representative of the flow rate of said overhead vapor product; and
- means for multiplying said nineteenth signal by the sum of said seventeenth, eighteenth and fourth signals to establish said ninth signal.

8. Apparatus in accordance with claim 7 wherein said means for establishing said tenth signal comprises:
- means for establishing a twentieth signal representative of the actual pressure in said overhead accumulator;
- means for multiplying said twentieth signal by said sixth signal to establish a twenty-first signal; and
- means for dividing said twenty-first signal by the sum of said ninth signal and said sixth signal to establish said tenth signal.

9. Apparatus in accordance with claim 1 wherein said means for establishing said eleventh signal in response to said tenth signal comprises:
- means for establishing a seventeenth signal representative of the actual temperature in said overhead accumulator at said time $T_2$; and
- means for establishing said eleventh signal in response to said tenth signal and said seventeenth signal.

10. Apparatus in accordance with claim 1 wherein said means for establishing said twelfth signal in response to said eighth signal and said eleventh signal comprises means for subtracting said eleventh signal from said eighth signal and dividing the results by 100 to establish said twelfth signal.

11. Apparatus in accordance with claim 1 wherein said means for establishing said thirteenth signal comprises means for multiplying the actual slope of the ASTM boiling point curve for said overhead liquid product at said time $T_1$ by a factor derived by dividing said ninth signal by the slope of the equilibrium flash vaporization boiling point line for said overhead liquid product said time $T_1$.

12. Apparatus in accordance with claim 1 wherein said sixteenth signal is scaled so as to be representative of the flow rate of said upper external reflux required to maintain the actual ASTM end point temperature for said overhead liquid product substantially equal to the desired ASTM end point temperature and wherein said means for manipulating the flow rate of said upper external reflux in response to said sixteenth signal comprises:

a control valve operably located so as to control the flow of said upper external reflux;

means for establishing a seventeenth signal representative of the actual flow rate of said upper external reflux;

means for comparing said sixteenth signal and said seventeenth signal and for establishing an eighteenth signal which is responsive to the difference between said sixteenth signal and said seventeenth signal, wherein said eighteenth signal is scaled so as to be representative of the position of said control valve required to maintain the actual flow rate of said upper external reflux substantially equal to the desired flow rate represented by said sixteenth signal; and means for manipulating said control valve in response to said eighteenth signal.

13. A method for maintaining a desired ASTM end point temperature for the overhead liquid product stream withdrawn from an overhead accumulator associated with a fractional distillation column, wherein a feed stream containing hydrocarbons and inerts including hydrogen is provided to said fractional distillation column, wherein an overhead vapor stream is withdrawn from an upper portion of said fractional distillation column, cooled, and then provided to said overhead accumulator, wherein an overhead vapor product is also withdrawn from said overhead accumulator and wherein an upper external reflux is provided to an upper portion of said fractional distillation column, said method comprising the steps of:

establishing a first signal representative of the heat removed per unit of said feed stream by said fractional distillation column at a time $T_2$;

establishing a second signal representative of the heat removed per unit of said feed stream by said fractional distillation column at a time $T_1$ which is earlier in time than said time $T_2$;

establishing a third signal representative of the change in heat removed per unit of said feed stream by said fractional distillation column between said time $T_2$ and time $T_1$;

establishing a fourth signal representative of any change in the hydrogen concentration in said overhead vapor stream between said time $T_2$ and said time $T_1$ in response to said third signal;

establishing a fifth signal representative of the actual moles of inerts contained in said overhead vapor stream at said time $T_2$ in response to said fourth signal;

establishing a sixth signal representative of the actual moles of hydrocarbon contained in said overhead vapor stream in response to said fourth signal;

establishing a seventh signal representative of the hydrocarbon partial pressure in the upper portion of said fractional distillation column in response to said fifth and sixth signals;

establishing an eighth signal representative of the equilibrium flash vaporization end point temperature (EFVEP) at said time $T_2$ for said overhead liquid product in response to said seventh signal;

establishing a ninth signal representative of the actual moles of inerts in said overhead vapor stream at said time $T_2$ in response to said fourth signal;

establishing a tenth signal representative of the hydrocarbon partial pressure in said overhead accumulator in response to said ninth signal and said sixth signal;

establishing an eleventh signal representative of the equilibrium flash vaporization initial point temperature (EFVIP) for said overhead liquid product at said time $T_2$ in response to said tenth signal;

establishing a twelfth signal representative of the slope of the equilibrium flash vaporization boiling point line for said overhead liquid product at said time $T_2$ in response to said eighth signal and said eleventh signal;

establishing a thirteenth signal representative of the actual slope of the ASTM boiling point curve for said overhead liquid product at said time $T_2$ in response to said twelfth signal;

establishing a fourteenth signal representative of the actual ASTM end point temperature for said overhead liquid product in response to said thirteenth signal;

establishing a fifteenth signal representative of the desired ASTM end point temperature for said overhead liquid product stream;

comparing said fourteenth signal and said fifteenth signal and establishing a sixteenth signal which is responsive to the difference between said fourteenth signal and said fifteenth signal; and manipulating the flow rate of said upper external reflux to said fractional distillation column in response to said sixteenth signal to thereby maintain the actual ASTM end point temperature of said overhead liquid product substantially equal to the desired ASTM end point temperature represented by said fifteenth signal.

14. A method in accordance with claim 13 wherein said step of establishing said fourth signal in response to said third signal comprises multiplying said third signal by a constant representative of the change in hydrogen concentration in said overhead vapor stream which occurs per unit change in the heat removed from said fractional distillation column to establish said fourth signal.

15. A method in accordance with claim 14 wherein steam is supplied as a stripping stream to said fractional distillation column and wherein said step of establishing said fifth signal in response to said fourth signal comprises:

establishing a seventeenth signal representative of the mole fraction of hydrocarbons containing four carbon atoms or less in said overhead vapor product;

establishing an eighteenth signal representative of the mole fraction of hydrogen in said overhead vapor stream at said time $T_1$;

establishing a nineteenth signal representative of the flow rate of said overhead vapor product;

multiplying said nineteenth signal by the sum of said seventeenth, eighteenth and fourth signals to establish a twentieth signal;

establishing a twenty-first signal representative of the actual flow rate of steam to said fractional distillation column; and dividing said twenty-first signal by the molecular weight of steam to establish a twenty-second signal; and summing said twentieth signal and said twenty-second signal to establish said fifth signal.

16. A method in accordance with claim 15 wherein said step of establishing said sixth signal comprises:

adding said fourth signal to said eighteenth signal to establish a twenty-third signal representative of the actual mole fraction of hydrogen in said overhead vapor stream;

summing said seventeenth signal and said twenty-third signal to establish a twenty-fourth signal;

subtracting said twenty-fourth signal from 1 to establish a twenty-fifth signal;

multiplying said twenty-fifth signal by said nineteenth signal converted to pound moles to establish a twenty-sixth signal;

establishing a twenty-seventh signal representative of the actual flow rate of said overhead liquid product;

establishing a twenty-eighth signal representative of the molecular weight of the hydrocarbon contained in said overhead liquid product;

dividing said twenty-seventh signal by said twenty-eighth signal to establish a twenty-ninth signal; and summing said twenty-sixth signal and said twenty-ninth signal to establish said sixth signal.

17. A method in accordance with claim 16 wherein said step of establishing said seventh signal comprises:

establishing a thirtieth signal representative of the actual pressure in the upper portion of said fractional distillation column;

multiplying said thirtieth signal by said sixth signal to establish a thirty-first signal; and dividing said thirty-first signal by the sum of said fifth signal and said sixth signal to establish said seventh signal.

18. A method in accordance with claim 13 wherein said step of establishing said eighth signal in response to said seventh signal comprises:

establishing a seventeenth signal representative of the actual temperature of said overhead vapor stream at said time $T_2$; and establishing said eighth signal in response to said seventh signal and said seventeenth signal.

19. A method in accordance with claim 14 wherein said step of establishing said ninth signal in response to said fourth signal comprises:

establishing a seventeenth signal representative of the mole fraction of hydrocarbons containing four carbon atoms or less in said overhead vapor product;

establishing an eighteenth signal representative of the mole fraction of hydrogen in said overhead vapor stream at said time $T_1$;

establishing a nineteenth signal representative of the flow rate of said overhead vapor product; and means for multiplying said nineteenth signal by the sum of said seventeenth, eighteenth and fourth signals to establish said ninth signal.

20. A method in accordance with claim 19 wherein said step of establishing said tenth signal comprises:

establishing a twentieth signal representative of the actual pressure in said overhead accumulator;

multiplying said twentieth signal by said sixth signal to establish a twenty-first signal; and dividing said twenty-first signal by the sum of said ninth signal and said sixth signal to establish said tenth signal.

21. A method in accordance with claim 13 wherein said step of establishing said eleventh signal in response to said tenth signal comprises:

establishing a seventeenth signal representative of the actual temperature in said overhead accumulator at said time $T_2$; and establishing said eleventh signal in response to said tenth signal and said seventeenth signal.

22. A method in accordance with claim 13 wherein said step of establishing said twelfth signal in response to said eighth signal and said eleventh signal comprises subtracting said eleventh signal from said eighth signal and dividing the results by 100 to establish said twelfth signal.

23. A method in accordance with claim 13 wherein said step of establishing said thirteenth signal comprises multiplying the actual slope of the ASTM boiling point curve for said overhead liquid product at said time $T_1$ by a factor derived by dividing said ninth signal by the slope of the equilibrium flash vaporization boiling point line for said overhead liquid product at said time $T_1$.

24. A method in accordance with claim 13 wherein said sixteenth signal is scaled so as to be representative of the flow rate of said upper external reflux required to maintain the actual ASTM end point temperature for said overhead liquid product substantially equal to the desired ASTM end point temperature and wherein said step of manipulating the flow rate of said upper external reflux in response to said sixteenth signal comprises:

establishing a seventeenth signal representative of the actual flow rate of said upper external reflux;

comparing said sixteenth signal and said seventeenth signal and establishing an eighteenth signal which is responsive to the difference between said sixteenth signal and said seventeenth signal, wherein said eighteenth signal is scaled so as to be representative of the position of a control valve operably located so as to control the flow of said upper external reflux, required to maintain the actual flow rate of said upper external reflux substantially equal to the desired flow rate represented by said sixteenth signal; and manipulating said control valve in response to said eighteenth signal.

* * * * *